(12) United States Patent
Baek et al.

(10) Patent No.: US 8,866,805 B2
(45) Date of Patent: Oct. 21, 2014

(54) STEREOSCOPIC IMAGE DISPLAY

(75) Inventors: Seungho Baek, Paju-si (KR); Jeongki Kim, Paju-si (KR); Jooah Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 270 days.

(21) Appl. No.: 13/605,730

(22) Filed: Sep. 6, 2012

(65) Prior Publication Data

US 2013/0057533 A1 Mar. 7, 2013

(30) Foreign Application Priority Data

Sep. 7, 2011 (KR) .................. 10-2011-0090874

(51) Int. Cl.
| | | |
|---|---|---|
| *G06F 3/038* | (2013.01) | |
| *G09G 5/00* | (2006.01) | |
| *H04N 5/70* | (2006.01) | |
| *G09G 3/00* | (2006.01) | |
| *H04N 13/04* | (2006.01) | |

(52) U.S. Cl.
CPC .............. *H04N 5/70* (2013.01); *G09G 3/003* (2013.01); *H04N 13/0452* (2013.01); *H04N 13/0434* (2013.01); *H04N 13/0497* (2013.01)
USPC ........................................................ 345/211

(58) Field of Classification Search
None
See application file for complete search history.

(56) References Cited

U.S. PATENT DOCUMENTS

2010/0265230 A1* 10/2010 Kang ........................... 345/211
2011/0128269 A1 6/2011 Lee et al.

FOREIGN PATENT DOCUMENTS

| CN | 1604166 A | 4/2005 |
|---|---|---|
| CN | 102081911 A | 6/2011 |
| EP | 2 227 026 A1 | 9/2010 |
| GB | 2 469 536 A | 10/2010 |

OTHER PUBLICATIONS

European Patent Office, European Search Report and Opinion, European Patent Application No. 12183357.8, Nov. 25, 2013, six pages.
Chinese First Office Action, Chinese Application No. 201210327848.6, Jun. 30, 2014, 10 pages.

* cited by examiner

*Primary Examiner* — Nicholas Lee
(74) *Attorney, Agent, or Firm* — Fenwick & West LLP

(57) ABSTRACT

A stereoscopic image display includes a display panel which includes a plurality of pixels each including a main display unit and an auxiliary display unit, is divided into a first screen block and a second screen block, and includes a first discharge control line connected to auxiliary display units of the first screen block and a second discharge control line connected to auxiliary display units of the second screen block, a control voltage generator which generates a first discharge control voltage of a first AC waveform and a second discharge control voltage of a second AC waveform, of which a phase is later than a phase of the first AC waveform by a half frame period, and a control voltage delay unit which delays the first and second discharge control voltages.

8 Claims, 15 Drawing Sheets

(A) Before improvement (no-delay drive)

(B) After improvement (delay drive)

(A) Before improvement(no-delay drive)  (B) After improvement(delay drive)

STEREOSCOPIC IMAGE DISPLAY

CROSS-REFERENCE TO RELATED APPLICATION

This application claims priority to Republic of Korea Patent Application No. 10-2011-0090874 filed on Sep. 7, 2011, which is incorporated herein by reference in its entirety.

BACKGROUND OF THE INVENTION

1. Field of the Invention

Embodiments of the invention relate to a stereoscopic image display capable of selectively displaying a two-dimensional plane image (hereinafter referred to as "2D image") and a three-dimensional stereoscopic image (hereinafter referred to as "3D image").

2. Discussion of the Related Art

A stereoscopic image display capable of selectively displaying a 2D image and a 3D image has been developed and has been available on the market owing to the development of various contents and circuit technology. A method for displaying the 3D image of the stereoscopic image display is mainly classified into a stereoscopic technique and an autostereoscopic technique.

The stereoscopic technique uses a parallax image between left and right eyes of a user with a high stereoscopic effect. This technique includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a display panel, and a stereoscopic image is displayed using polarized glasses or liquid crystal (LC) shutter glasses.

A LC shutter glasses type stereoscopic image display alternately displays a left eye image and a right eye image on a display element every one frame and opens and closes a left eye shutter and a right eye shutter of LC shutter glasses in synchronization with display timing, thereby implementing the 3D image. In the LC shutter glasses type stereoscopic image display, because the LC shutter glasses have a short data-on time, a luminance of the 3D image is low. Further, an extremely high 3D crosstalk is experienced because of the synchronization between the display element and the LC shutter glasses and the On/Off conversion response characteristic.

In a polarized glasses type stereoscopic image display, a polarization separation device, such as a patterned retarder, has to be attached to a display panel. The patterned retarder separates polarized light of a left eye image and a right eye image displayed on the display panel. A viewer wears polarized glasses when viewing a stereoscopic image on the polarized glasses type stereoscopic image display. Hence, the viewer sees polarized light of the left eye image through a left eye filter of the polarized glasses and polarized light of the right eye image through a right eye filter of the polarized glasses, thereby giving a stereoscopic feeling.

The display panel of the existing polarized glasses type stereoscopic image display may use a liquid crystal display panel. A parallax is generated between a pixel array of the liquid crystal display panel and the patterned retarder due to a thickness of an upper glass substrate of the liquid crystal display panel and a thickness of an upper polarizing plate, and thus leads to a poor vertical viewing angle. When the viewer views a stereoscopic image displayed on the polarized glasses type stereoscopic image display at a vertical viewing angle higher or lower than the front of the liquid crystal display panel, the viewer may experience the 3D crosstalk, where the left eye image and the right eye image overlap with each other when viewed with a single eye (i.e., the left eye or the right eye).

To solve the problem of the 3D crosstalk at the vertical viewing angle in the polarized glasses type stereoscopic image display, Japanese Laid Open Publication No. 2002-185983 proposed a method for forming black stripes on a patterned retarder (or 3D film) of a stereoscopic image display. In a method different from this method, the width of black matrices formed on a liquid crystal display panel can be increased. However, the formation of the black stripes on the patterned retarder may result in a reduction in luminance of 2D and 3D images, and the black matrices may interact with the black stripes, thereby generating moire. Further, an increase in the width of the black matrices may reduce an aperture ratio, thereby reducing the luminance of the 2D and 3D images.

To solve the problem of the polarized glasses type stereoscopic image display disclosed in Japanese Laid Open Publication No. 2002-185983, a technology for dividing each of pixels of a display panel into two parts and controlling one of the two parts using an active black stripe was disclosed in Republic of Korea Patent Application No. 10-2009-0033534 (filed on Apr. 17, 2009) and U.S. patent application Ser. No. 12/536,031 (filed on Aug. 5, 2009) assigned to the same assignee as this application, and which are hereby incorporated by reference in their entirety. The stereoscopic image display proposed in these applications divides each of the pixels into the two parts and writes 2D image data to each of the divided pixels in a 2D mode to prevent a reduction in a luminance of a 2D image and also widen a vertical viewing angle of a 3D image. Hence, the stereoscopic image display proposed by the present applicant may improve the visibility of both the 2D and 3D images and may provide more excellent display quality than the existing stereoscopic image display. The active black stripe may include a thin film transistor (TFT) and a liquid crystal cell. However, in the active black stripe technology, which has been already proposed by the assignee of this application, the number of gate lines increased because of the division of each pixel into the two parts, and thus configuration of a gate driver became complicated.

Accordingly, a technology for discharging a voltage of a liquid crystal cell of an active black stripe up to a voltage of a black gray level was proposed by the assignee of this application in a 3D mode in Republic of Korea Patent Application No. 10-2010-0023888 (filed on Mar. 17, 2010). In this technology, a relatively high discharge control voltage was applied to a gate electrode of a TFT included in the active black stripe for a predetermined period of time, thereby allowing an on-current to flow in the TFT of the active black stripe. In this instance, a threshold voltage of the TFT of the active black stripe was shifted because of a gate bias stress, and thus driving characteristics of the TFT may be degraded. To increase the completeness of the technology of the active black stripe in the 3D mode, it is necessary to secure a sufficient discharge time of the active black stripes on the entire screen, so that the active black stripes on the entire screen can represent the black gray level.

SUMMARY OF THE INVENTION

Embodiments of the invention provide a stereoscopic image display capable of reducing the degradation of driving characteristics of thin film transistors included in active black stripes and discharging all the active black stripes of the entire screen up to a voltage of a black gray level.

Embodiments of the invention provide a stereoscopic image display capable of preventing a line dim when thin film transistors included in active black stripes are driven with being divided into blocks so as to reduce the degradation of driving characteristics of the thin film transistors.

In one aspect, a stereoscopic image display includes a display panel including data lines, gate lines crossing the data lines, and a plurality of pixels, each of which includes a main display unit and an auxiliary display unit, the display panel being divided into a first screen block and a second screen block, the display panel including a first discharge control line connected to auxiliary display units of the first screen block and a second discharge control line connected to auxiliary display units of the second screen block, a data driving circuit configured to supply a data voltage of a 2D image to the data lines in a 2D mode and supply a data voltage of a 3D image to the data lines in a 3D mode, a gate driving circuit configured to sequentially supply a scan pulse, which swings between a gate low voltage and a gate high voltage, to the gate lines in the 2D mode and the 3D mode, a control voltage generator configured to generate a first discharge control voltage of a first alternating current (AC) waveform and a second discharge control voltage of a second AC waveform, of which a phase is later than a phase of the first AC waveform by a half frame period, in the 3D mode, and a control voltage delay unit configured to delay the first discharge control voltage, supply the delayed first discharge control voltage to the first discharge control line, delay the second discharge control voltage, and supply the delayed second discharge control voltage to the second discharge control line.

In another aspect, a stereoscopic image display includes a display panel including data lines, gate lines crossing the data lines, and a plurality of pixels, each of which includes a main display unit and an auxiliary display unit, the display panel being divided into a first screen block and a second screen block, the display panel including a first discharge control line connected to auxiliary display units of the first screen block and a second discharge control line connected to auxiliary display units of the second screen block, a data driving circuit configured to supply a data voltage of a 2D image to the data lines in a 2D mode and supply a data voltage of a 3D image to the data lines in a 3D mode, a gate driving circuit configured to sequentially supply a scan pulse, which swings between a gate low voltage and a gate high voltage, to the gate lines in the 2D mode and the 3D mode, and a control voltage generator configured to generate a first discharge control voltage of a first AC waveform in the 3D mode, supply the first discharge control voltage to the first discharge control line, generate a second discharge control voltage of a second AC waveform, of which a phase is later than a phase of the first AC waveform by a half frame period, in the 3D mode, and supply the second discharge control voltage to the second discharge control line, wherein each of the first discharge control line and the second discharge control line is in a wavy form.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Example embodiments of the invention will be described with reference to FIGS. 1 to 17.

Figure 1:
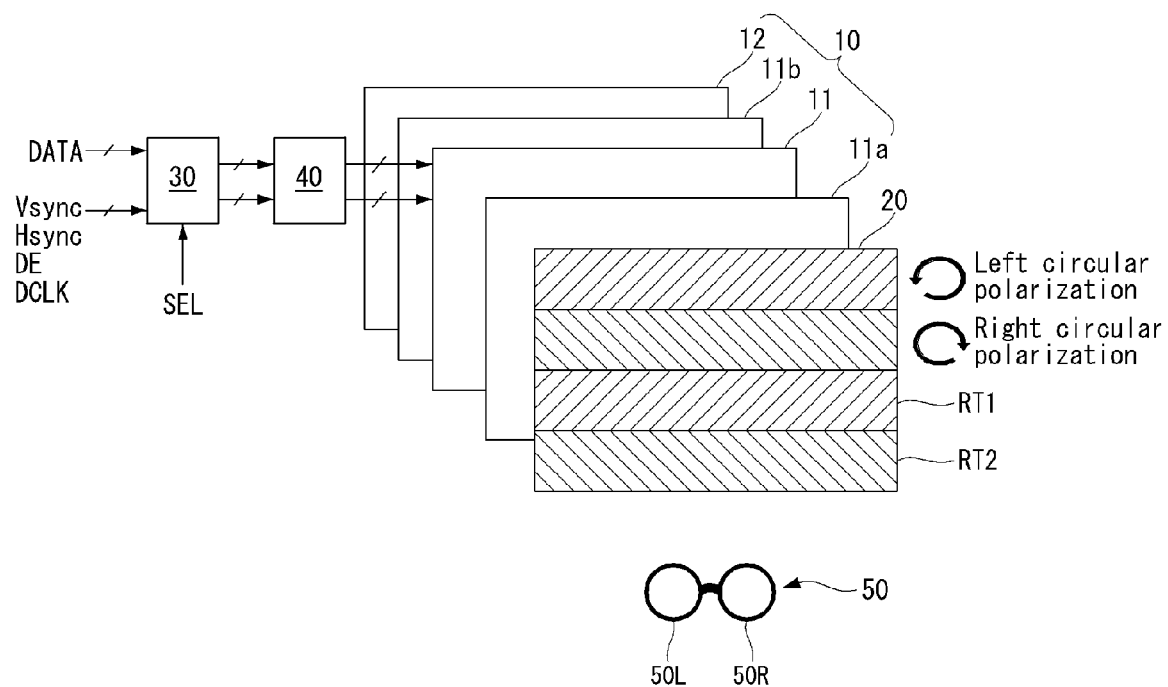
FIGS. 1 and 2 illustrate a polarized glasses type stereoscopic image display according to an example embodiment of the invention.
Figure 2:
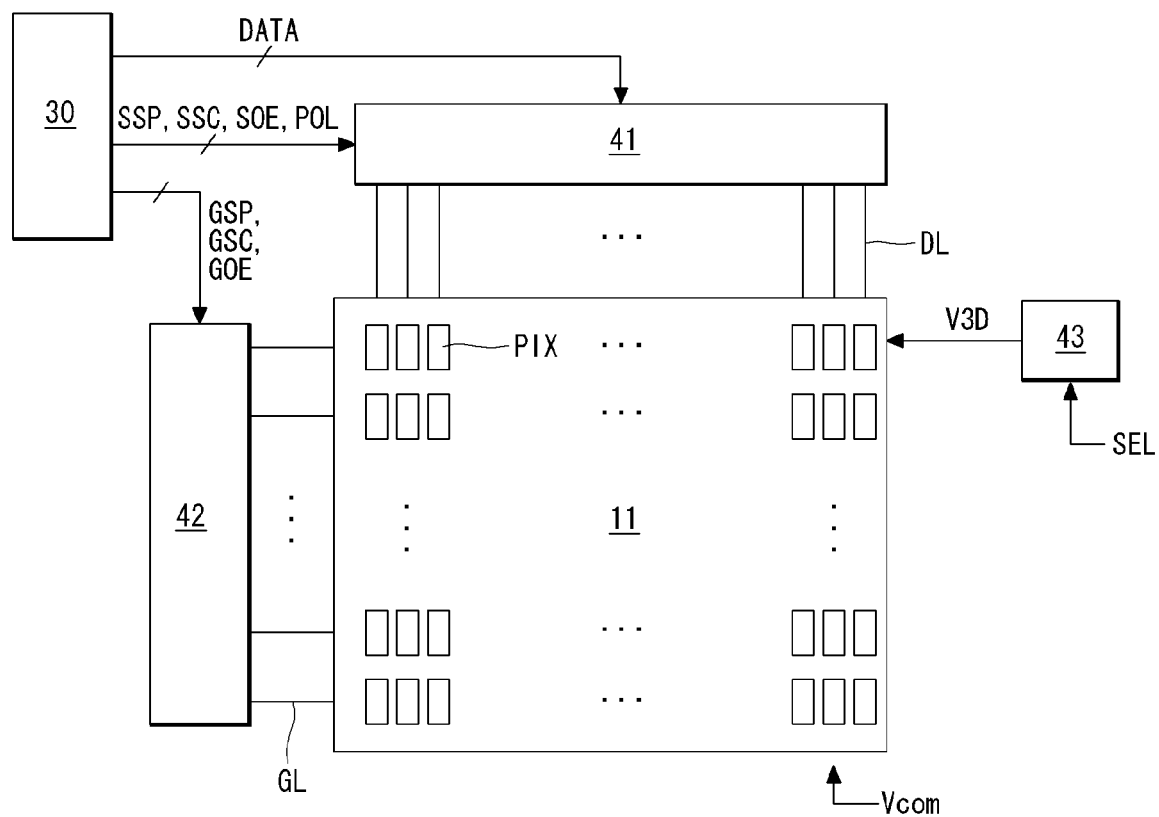
Figure 3:
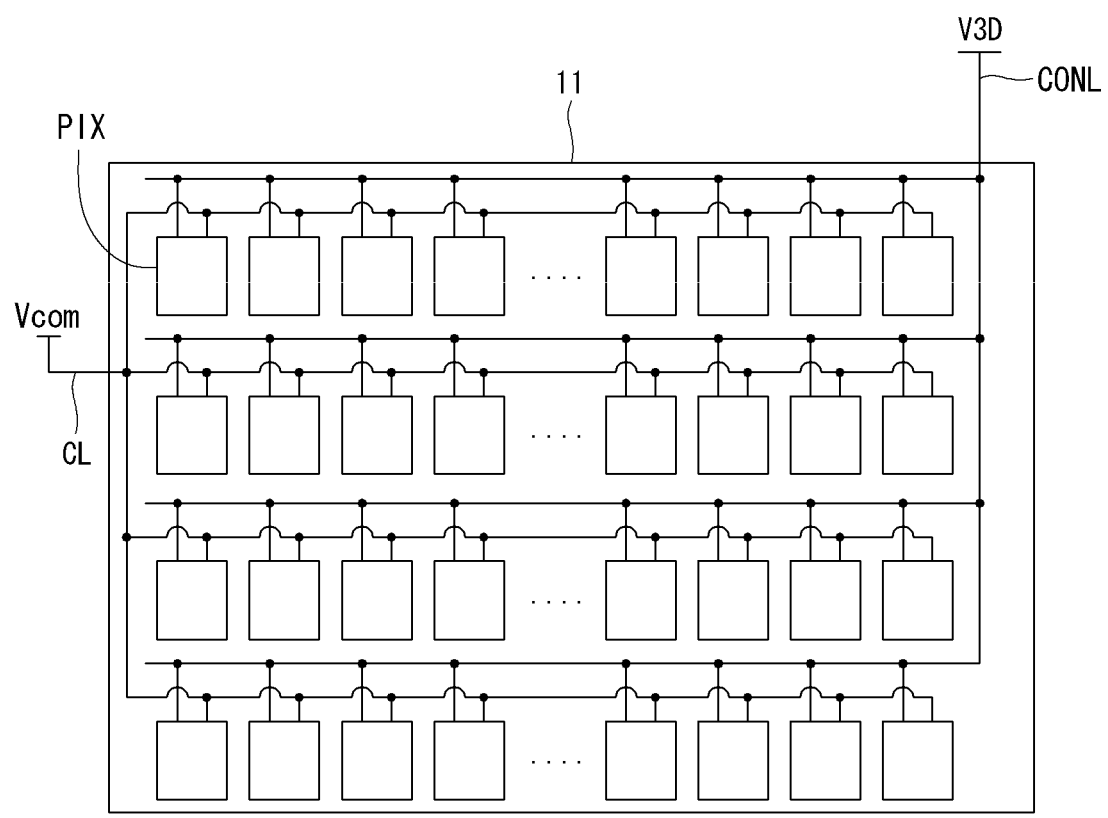
FIG. 3 illustrates an example of a non-division driving manner of a stereoscopic image display.

FIGS. 1 and 2 illustrate a polarized glasses type stereoscopic image display according to an example embodiment of the invention. FIG. 3 illustrates an example of a non-division driving manner of a stereoscopic image display.

As shown in FIGS. 1 to 3, the stereoscopic image display according to the embodiment of the invention includes a display element 10, a patterned retarder 20, a controller 30, a panel driving circuit 40, and polarized glasses 50.

The display element 10 may be implemented as a flat panel display, such as a liquid crystal display (LCD), a field emission display (FED), a plasma display panel (PDP) display, an electroluminescence device (EL) including an inorganic electroluminescence element and an organic light emitting diode (OLED), and an electrophoretic display (EPD). In the following description, the stereoscopic image display according to the embodiment of the invention is described using the liquid crystal display as the display element 10.

The display element 10 includes a display panel 11, an upper polarizing film 11a, and a lower polarizing film 11b.

The display panel 11 displays a 2D image in a 2D mode, and displays a 3D image in a 3D mode. The display panel 11 includes an upper glass substrate, a lower glass substrate, and a liquid crystal layer between the upper and lower glass substrates. A plurality of data lines DL, a plurality of gate lines GL crossing the data lines DL, a common line CL to which a common voltage Vcom is supplied, a discharge control line CONL to which a discharge control voltage V3D is supplied, etc. are formed on the lower glass substrate of the display panel 11. Black matrixes and color filters are formed on the upper glass substrate of the display panel 11.

The upper polarizing film 11a is attached to the upper glass substrate of the display panel 11, and the lower polarizing film 11b is attached to the lower glass substrate of the display panel 11. Alignment layers for setting a pre-tilt angle of liquid crystals are respectively formed on the upper and lower glass substrates of the display panel 11. In a vertical electric field driving manner such as a twisted nematic (TN) mode and a vertical alignment (VA) mode, common electrodes supplied with the common voltage Vcom may be formed on the upper glass substrate. In a horizontal electric field driving manner such as an in-plane switching (IPS) mode and a fringe field switching (FFS) mode, the common electrodes may be formed on the lower glass substrate along with pixel electrodes. A column spacer may be formed between the upper and lower glass substrates to keep cell gaps of the liquid crystal cells of the display panel 11 constant.

The display element 10 according to the embodiment of the invention may be implemented as any type of liquid crystal display including a transmissive liquid crystal display, a transflective liquid crystal display, and a reflective liquid crystal display. A backlight unit 12 is necessary in the transmissive liquid crystal display and the transflective liquid crystal display. The backlight unit 12 may be implemented as a direct type backlight unit or an edge type backlight unit.

Figure 4:
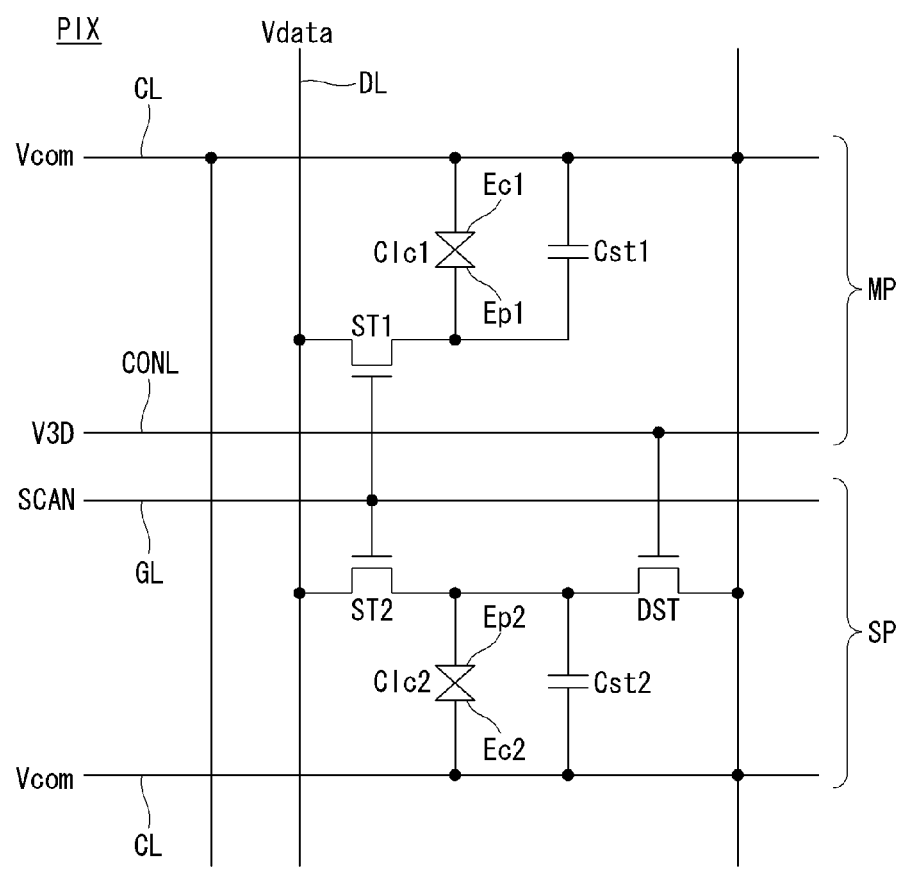
FIG. 4 is an equivalent circuit diagram illustrating a connection configuration of a pixel shown in FIG. 3.

A plurality of unit pixels are disposed on the display panel 11 in a matrix form based on a crossing structure between the data lines DL and the gate lines GL, which collectively constitute a pixel array. Each of the unit pixels includes three pixels PIX, each displaying red, green, and blue images. As shown in FIG. 4, each pixel PIX includes a main display unit MP and an auxiliary display unit SP functioning as an active black stripe. The auxiliary display units SP of the pixels may be commonly connected to the discharge control line CONL in conformity with the non-division driving manner shown in FIG. 3. The discharge control voltage V3D for controlling a discharge operation of the auxiliary display units SP is supplied to discharge control thin film transistors (TFTs) DST of the auxiliary display units SP through the discharge control line CONL.

The main display unit MP displays video data of the 2D image in the 2D mode, and displays video data of the 3D image in the 3D mode. On the other hand, the auxiliary display unit SP displays the video data of the 2D image in the 2D mode, but displays an image of a black gray level in the 3D mode. The auxiliary display unit SP serves as the active black stripe in the 3D mode. The auxiliary display unit SP increases an aperture ratio and a luminance of the 2D image in the 2D mode, and widens a vertical viewing angle of the 3D image in the 3D mode. The sizes and the shapes of the main display unit MP and the auxiliary display unit SP of one pixel may be properly designed to take into account driving characteristics of the display panel, a luminance of a display image, a viewing angle of the 3D image, characteristics of applied products, etc.

The patterned retarder 20 is attached to the upper polarizing film 11a of the display panel 11. The patterned retarder 20 includes a plurality of first retarders RT1 respectively formed on odd-numbered lines of the patterned retarder 20, and a plurality of second retarders RT2 respectively formed on even-numbered lines of the patterned retarder 20. Light absorption axes of the first retarders RT1 are different from light absorption axes of the second retarders RT2. The first retarders RT1 are opposite to odd-numbered horizontal pixel lines of the pixel array, and the second retarders RT2 are opposite to even-numbered horizontal pixel lines of the pixel array. The first retarders RT1 retard a phase of linearly polarized light incident through the upper polarizing film 11a by a quarter wavelength and transmit it as first polarized light (for example, left-circularly polarized light). The second retarders RT2 retard a phase of linearly polarized light incident through the upper polarizing film 11a by three-quarter wavelength and transmit it as second polarized light (for example, right-circularly polarized light).

The controller 30 controls the operation of the panel driving circuit 40 according to the 2D mode or the 3D mode in response to a mode selection signal SEL. The controller 30 receives the mode selection signal SEL through a user interface, such as a touch screen, an on-screen display (OSD), a keyboard, a mouse, and a remote controller. The controller 30 may switch between an operation of the 2D mode and an operation of the 3D mode in response to the mode selection signal SEL. The controller 30 detects a 2D/3D identification code encoded to data of an input image, for example, a 2D/3D identification code capable of being coded to an electronic program guide (EPG) or an electronic service guide (ESG) of a digital broadcasting standard, thereby distinguishing between the 2D mode and the 3D mode.

In the 3D mode, the controller 30 divides 3D image data received from a video source into RGB data of a left eye image and RGB data of a right eye image. The controller 30 then supplies the RGB data of the left eye image and the RGB data of the right eye image to a data driver 41 of the panel driving circuit 40. In the 2D mode, the controller 30 supplies RGB data of a 2D image received from the video source to the data driver 41.

The controller 30 generates control signals for controlling operation timing of the panel driving circuit 40 using timing signals such as a vertical sync signal Vsync, a horizontal sync signal Hsync, a data enable DE, and a dot clock DCLK.

A data control signal for controlling operation timing of the data driver 41 of the panel driving circuit 40 includes a source start pulse SSP, a source sampling clock SSC, a source output enable SOE, a polarity control signal POL, and the like. The source start pulse SSP indicates a supply start time of data corresponding to one horizontal line in one horizontal period during which the data corresponding to the one horizontal line is displayed. The source sampling clock SSC controls a latch operation of data based on a rising or falling edge thereof. The source output enable SOE controls an output of the data driver 41. The polarity control signal POL controls a polarity of a data voltage to be supplied to the liquid crystal cells of the display panel 11.

A gate control signal for controlling operation timing of a gate driver 42 of the panel driving circuit 40 includes a gate start pulse GSP, a gate shift clock GSC, a gate output enable GOE, and the like. The gate start pulse GSP indicates a start horizontal line of a scan operation in one vertical period during which one screen is displayed. The gate shift clock GSC is input to a shift register inside the gate driver 42 and sequentially shifts the gate start pulse GSP. The gate output enable GOE controls an output of the gate driver 42.

The controller 30 multiplies the frequency of the timing signals Vsync, Hsync, DE, and DCLK synchronized with an input frame frequency by N to obtain a frame frequency of (f×N) Hz, where N is a positive integer equal to or greater than 2, and f is the input frame frequency. Hence, the controller 30 may control the operation of the panel driving circuit 40 based on the frame frequency of (f×N) Hz. The input frame frequency is 50 Hz in a phase alternate line (PAL) scheme and 60 Hz in a national television standards committee (NTSC) scheme.

The panel driving circuit 40 includes the data driver 41 for driving the data lines DL of the display panel 11, the gate driver 41 for driving the gate lines GL of the display panel 11, and a discharge control voltage generating circuit 43 for driving the discharge control line CONL of the display panel 11.

The data driver 41 includes a plurality of driver integrated circuits (ICs). Each of the driver ICs includes a shift register, a latch, a digital-to-analog converter (DAC), an output buffer, etc. The data driver 41 latches the RGB data of the 2D or 3D image in response to the data control signals SSP, SSC, and SOE. The data driver 41 converts the RGB data of the 2D/3D image into analog positive and negative gamma compensation voltages in response to the polarity control signal POL and inverts a polarity of the data voltage. The data driver 41 outputs the data voltage to the data lines DL, so that the data voltage is synchronized with a scan pulse (or a gate pulse) output from the gate driver 42. The driver ICs of the data driver 41 may be bonded to the lower glass substrate of the display panel 11 through a tape automated bonding (TAB) process.

The gate driver 42 generates the scan pulse that swings between a gate high voltage and a gate low voltage in response to the gate control signals GSP, GSC, and GOE. The gate driver 42 supplies the scan pulse to the gate lines GL in a line sequential manner in response to the gate control signals GSP, GSC, and GOE. The gate driver 42 includes a gate shift register array, etc. The gate shift register array of the gate driver 42 may be formed in a non-display area outside a display area of the display panel 11, in which the pixel array is formed, in a gate-in-panel (GIP) manner. A plurality of gate shift registers included in the gate shift register array may be formed with along the pixel array in a thin film transistor (TFT) process of the pixel array in the GIP manner. The gate shift register array of the gate driver 42 may be implemented as driver ICs bonded to the lower glass substrate of the display panel 11 through the TAB process.

The discharge control voltage generating circuit 43 generates different discharge control voltage V3D in response to the mode selection signal SEL. In the 2D mode, the discharge control voltage V3D may be generated at a level substantially equal to the gate low voltage. In the 3D mode, the discharge control voltage V3D is generated at a slight-on level, which is higher than the gate low voltage but lower than the gate high voltage, and also may be periodically reduced to a level of the gate low voltage so as to prevent or reduce the degradation of the discharge control TFT DST.

The polarized glasses 50 include a left eyeglass 50L having a left eye polarizing filter and a right eyeglass 50R having a right eye polarizing filter. The left eye polarizing filter has the same light absorption axis as the first retarder RT1 of the patterned retarder 20, and the right eye polarizing filter has the same light absorption axis as the second retarder RT2 of the patterned retarder 20. For example, a left circular polarizing filter may be selected as the left eye polarizing filter of the polarized glasses 50, and a right circular polarizing filter may be selected as the right eye polarizing filter of the polarized glasses 50. A user may view the 3D image, which is displayed on the display element 10 in a spatial division manner, through the polarized glasses 50.

FIG. 4 illustrates in detail a connection configuration of the pixel PIX shown in FIG. 3. As shown in FIG. 4, the main display unit MP includes a first pixel electrode Ep1, a first common electrode Ec1 which is opposite to the first pixel electrode Ep1 to constitute a first liquid crystal (LC) capacitor Clc1, and a first storage capacitor Cst1. The first pixel electrode Ep1 is connected to the data line DL through a first switch ST1. The first switch ST1 is turned on in response to a scan pulse SCAN, and thus a data voltage Vdata on the data line DL is applied to the first pixel electrode Ep1. A gate electrode of the first switch ST1 is connected to the gate line GL, a source electrode of the first switch ST1 is connected to the data line DL, and a drain electrode of the first switch ST1 is connected to the first pixel electrode Ep1. The first common electrode Ec1 is connected to the common line CL charged to the common voltage Vcom. The first storage capacitor Cst1 is formed by an overlap of the first pixel electrode Ep1 and the common line CL with an insulating layer interposed between them.

The auxiliary display unit SP includes a second pixel electrode Ep2, a second common electrode Ec2 which is opposite to the second pixel electrode Ep2 to constitute a second LC capacitor Clc2, and a second storage capacitor Cst2. The second pixel electrode Ep2 is connected to the data line DL through a second switch ST2. The second switch ST2 is turned on in response to the scan pulse SCAN, and thus the data voltage Vdata on the data line DL is applied to the second pixel electrode Ep2. A gate electrode of the second switch ST2 is connected to the gate line GL, a source electrode of the second switch ST2 is connected to the data line DL, and a drain electrode of the second switch ST2 is connected to the second pixel electrode Ep2. The second common electrode Ec2 is connected to the common line CL charged to the common voltage Vcom. The second storage capacitor Cst2 is formed by an overlap of the second pixel electrode Ep2 and the common line CL with an insulating layer interposed between them.

The second pixel electrode Ep2 is connected to the common line CL through the discharge control TFT DST. The discharge control TFT DST switches on or off a current path between the second pixel electrode Ep2 and the common line CL in response to the discharge control voltage V3D. A gate electrode of the discharge control TFT DST is connected to the discharge control line CONL, a source electrode of the discharge control TFT DST is connected to the second pixel electrode Ep2, and a drain electrode of the discharge control TFT DST is connected to the common line CL. When the discharge control voltage V3D generated at the level of the gate low voltage VGL is applied, the discharge control TFT DST completely closes a source-drain channel of the discharge control TFT DST and cuts off the current path between the second pixel electrode Ep2 and the common line CL. When the discharge control voltage V3D of a slight-on level SOL is applied, the discharge control TFT DST partially opens the source-drain channel of the discharge control TFT DST and establishes a partial current path between the second pixel electrode Ep2 and the common line CL.

The discharge control TFT DST is designed, so that it has the same channel capacitance as the first and second switches ST1 and ST2. Thus, the discharge control TFT DST is turned on at the slight-on level SOL (refer to FIG. 5) lower than a full-on level by applying the discharge control voltage V3D of the slight-on level SOL less than the gate high voltage VGH to the discharge control TFT DST. Even if the second switch ST2 and the discharge control TFT DST are turned on simultaneously, the amount of current flowing through the discharge control TFT DST is less than the amount of current flowing through the second switch ST2. Because a channel resistance is inversely proportional to the voltage applied to the gate electrode, a channel resistance of the discharge control TFT DST is greater than a channel resistance of the second switch ST2 even if the second switch ST2 and the discharge control TFT DST are simultaneously turned on.

Figure 5:
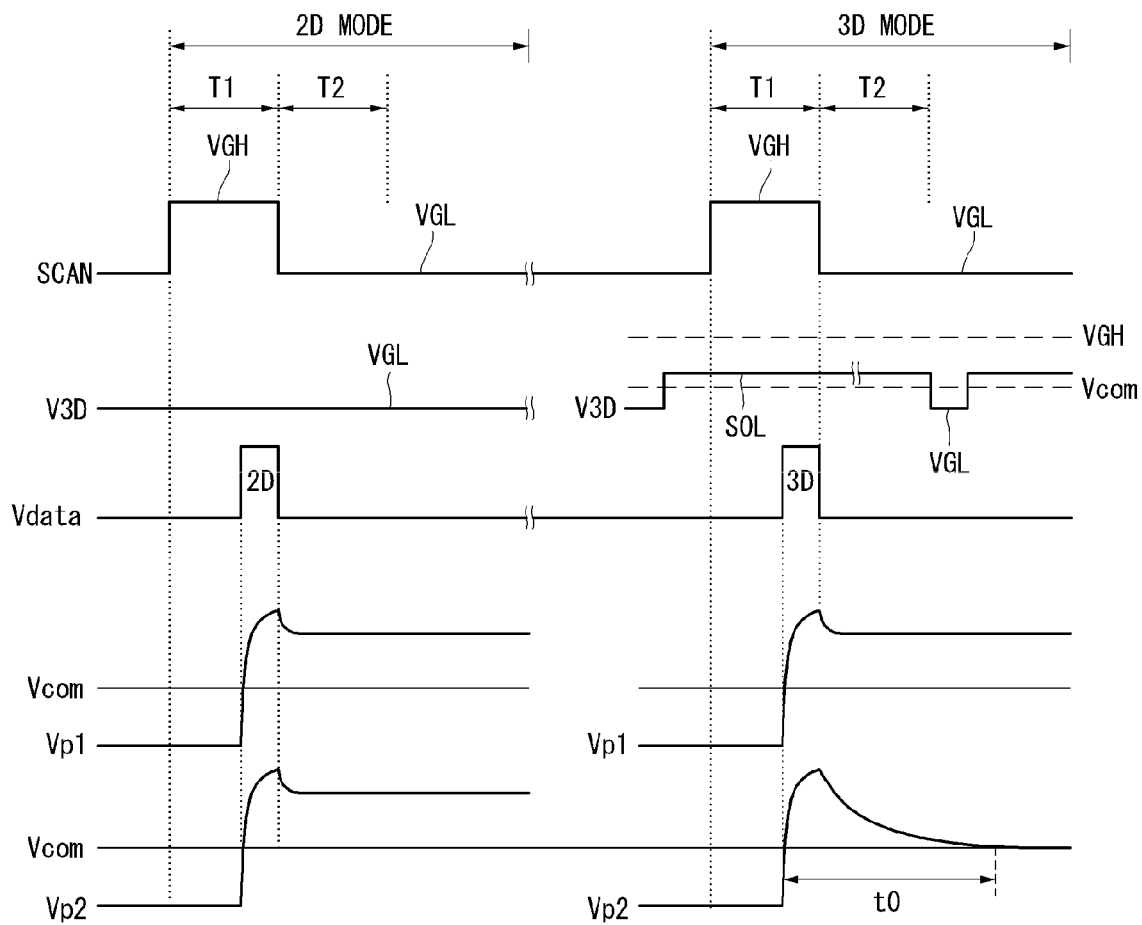
FIG. 5 illustrates charge and discharge waveforms of a pixel in each driving mode.
Figure 6:
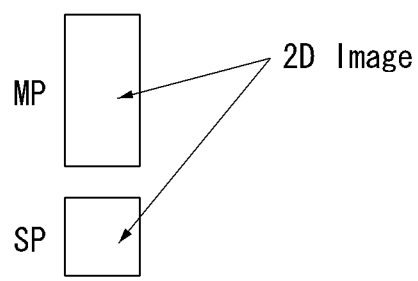
FIGS. 6 and 7 illustrate an operation of an auxiliary display unit in a 2D mode and a 3D mode, respectively.
Figure 7:
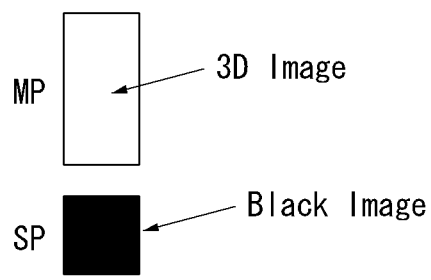

FIG. 5 illustrates charge and discharge waveforms of the pixel PIX in each driving mode. FIGS. 6 and 7 illustrate an operation of the auxiliary display unit in the 2D mode and the 3D mode, respectively. An operation and an operational effect of the pixel PIX in each driving mode are described with reference to FIGS. 5 through 7.

First, an operation and an operational effect of the pixel PIX in the 2D mode are described below. In the 2D mode, the discharge control voltage V3D may be generated at the same level as the gate low voltage VGL of the scan pulse SCAN. When the gate low voltage VGL of the scan pulse SCAN capable of turning off the switches ST1 and ST2 (refer to FIG. 4) of the display panel 11 is about −5V, a 2D control voltage V2D may be generated at about −5V. In the 2D mode, the discharge control TFT DST is held continuously in an off-state in response to the discharge control voltage V3D of the same level as the gate low voltage VGL during periods T1 and T2.

During the period T1, the first and second switches ST1 and ST2 are turned on simultaneously at the full-on level in response to the scan pulse SCAN of the gate high voltage VGH.

The first pixel electrode Ep1 of the main display unit MP is charged to a first pixel voltage Vp1 as the data voltage Vdata for the display of the 2D image due to the turn-on operation of the first switch ST1. The second pixel electrode Ep2 of the auxiliary display unit SP is charged to a second pixel voltage Vp2 as the data voltage Vdata for the display of the 2D image due to the turn-on operation of the second switch ST2. Because the first and second switches ST1 and ST2 are designed to be equivalent, the second pixel voltage Vp2 is substantially equal to the first pixel voltage Vp1.

During the period T2, the first and second switches ST1 and ST2 are simultaneously turned off in response to the scan pulse SCAN of the gate low voltage VGL.

When the first switch ST1 is turned off, the first pixel voltage Vp1 charged to the first pixel electrode Ep1 of the main display unit MP is shifted by a predetermined value due to a kickback voltage and then is held at a shifted value by the first storage capacitor Cst1. When the second switch ST2 is turned off, the second pixel voltage Vp2 charged to the second pixel electrode Ep2 of the auxiliary display unit SP is shifted by a predetermined value due to the kickback voltage and then is held at a shifted value by the second storage capacitor Cst2.

During the periods T1 and T2, the common voltage Vcom is applied to the first common electrode Ec1 of the main display unit MP and the second common electrode Ec2 of the auxiliary display unit SP through the common line CL. A difference between the first pixel voltage Vp1 and the common voltage Vcom is substantially equal to a difference between the second pixel voltage Vp2 and the common voltage Vcom. A transmittance of the liquid crystal cells is proportional to a voltage difference between the pixel electrode and the common electrode in a normally black liquid crystal mode. As a result, as shown in FIG. 6, the main display unit MP and the auxiliary display unit SP display the 2D image of the same gray level. The 2D image displayed on the auxiliary display unit SP functions to increase the luminance of the 2D image.

Next, an operation and an operational effect of the pixel PIX in the 3D mode are described below. In the 3D mode, the discharge control voltage V3D is generated at the slight-on level SOL. Further, the discharge control voltage V3D may be reduced to the gate low voltage VGL at predetermined time intervals, so as to reduce a positive gate bias stress of the discharge control TFT DST. The slight-on level SOL may be set higher than the common voltage Vcom but lower than the gate high voltage VGH of the scan pulse SCAN, so as to minimize the effect of the kickback voltage in a discharge process. When the gate high voltage VGH of the scan pulse SCAN capable of fully turning on the switches ST1 and ST2 of the display panel 11 is about 28V and the common voltage Vcom is about 7.5V, the discharge control voltage V3D of the slight-on level SOL may be generated at about 8V to 12V.

In the non-division driving manner shown in FIG. 3, a period during which the discharge control voltage V3D of the slight-on level SOL is generated may correspond to a display period of each frame, in which effective video data is displayed. A period during which the discharge control voltage V3D of the gate low voltage VGL is generated may correspond to a non-display period (i.e., a vertical blank period) between the adjacent display periods.

The discharge control TFT DST repeats an on-state of the slight-on level SOL and an off-state of the slight-on level SOL at predetermined time intervals in response to the discharge control voltage V3D. For example, the discharge control TFT DST is held in the on-state of the slight-on level SOL during the display period, and is held in the off-state of the slight-on level SOL during the vertical blank period between the display periods. The following periods T1 and T2 belong to the display period.

During the period T1, the first and second switches ST1 and ST2 are simultaneously turned on at the full-on level in response to the scan pulse SCAN of the gate high voltage VGH.

The first pixel electrode Ep1 of the main display unit MP is charged to the first pixel voltage Vp1 as the data voltage Vdata for the display of the 3D image due to the turn-on operation of the first switch ST1. The second pixel electrode Ep2 of the auxiliary display unit SP is charged to the second pixel voltage Vp2 as the data voltage Vdata for the display of the 3D image due to the turn-on operation of the second switch ST2. During the period T1, a channel resistance of the discharge control TFT DST having the on-state of the slight-on level is much greater than a channel resistance of the second switch ST2 having the on-state of the full-on level. Hence, an amount of discharge current drained from the second pixel electrode Ep2 is much less than an amount of charge current entering into the second pixel electrode Ep2. As a result, during the period T1, the discharge control TFT DST having the on-state of the slight-on level hardly affects charge characteristic of the second pixel voltage Vp2, and the second pixel voltage Vp2 is similar to the first pixel voltage Vp1.

During the period T2, the first and second switches ST1 and ST2 are simultaneously turned off in response to the scan pulse SCAN of the gate low voltage VGL.

When the first switch ST1 is turned off, the first pixel voltage Vp1, which has been charged to the first pixel electrode Ep1 of the main display unit MP, is shifted by a predetermined value because of the influence of the kickback voltage and then is held at a shifted value by the first storage capacitor Cst1. When the second switch ST2 is turned off, the second pixel voltage Vp2 charged to the second pixel electrode Ep2 of the auxiliary display unit SP is discharged to the level of the common voltage Vcom for a predetermined period of time because of the discharge current drained via the discharge control TFT DST. A channel resistance of the discharge control TFT DST having the on-state of the slight-on level is much less than a channel resistance of the second switch ST2 having the off-state. As a result, the second pixel voltage Vp2, which has been charged to the second pixel electrode Ep2 of the auxiliary display unit SP through the discharge control TFT DST, is gradually discharged and then is converged at the level of the common voltage Vcom without the influence of the kickback voltage.

During the periods T1 and T2, the common voltage Vcom is applied to the first common electrode Ec1 of the main display unit MP and the second common electrode Ec2 of the auxiliary display unit SP. Unlike the difference between the first pixel voltage Vp1 and the common voltage Vcom, a difference between the second pixel voltage Vp2 and the common voltage Vcom becomes substantially zero at a time when the discharge of the second pixel electrode Ep2 has been completed. As a result, according to the voltage difference-transmittance characteristic in the normally black liquid crystal mode, the main display unit MP displays the 3D image of a predetermined gray level, and the auxiliary display unit SP displays an image of a black gray level, as shown in FIG. 7. Thus, the auxiliary display unit SP serves as the active black stripe.

The black image displayed on the auxiliary display unit SP increases a display distance between the 3D images (i.e., between the left eye image and the right eye image), which are adjacent to each other in a vertical direction. Hence, the vertical viewing angle of the 3D image, at which a crosstalk is not generated, may be widely secured using the black image of the auxiliary display unit SP without a separate black stripe pattern.

In the 3D mode, because a slight-on current of the discharge control TFT DST is less than a full-on current of each of the first and second switches ST1 and ST2, a predetermined period of time t0 is required to discharge the second LC capacitor Clc2 of the auxiliary display unit SP up to the voltage of the black gray level. Thus, it may be difficult for the auxiliary display units SP of a lowermost horizontal pixel line, in which scan timing is relatively later than other horizontal pixel lines, to secure a sufficient discharge period. Further, in the 3D mode, the discharge control voltage V3D has to be periodically reduced to the level of the gate low voltage VGL so as to compensate for the gate bias stress of the discharge control TFT DST. However, it is difficult to sufficiently reduce the gate bias stress of the discharge control TFT DST in a short period of time of the vertical blank period. Accordingly, the stereoscopic image display according to the embodiment of the invention may be driven in an N-division driving manner, where N is a positive integer equal to or greater than 2, so as to secure the sufficient discharge period and efficiently prevent the degradation of the discharge control TFT DST. A 2-division driving manner where the display panel is divided into two parts is described herein. However, the embodiment of the invention is not limited thereto.

Figure 8:
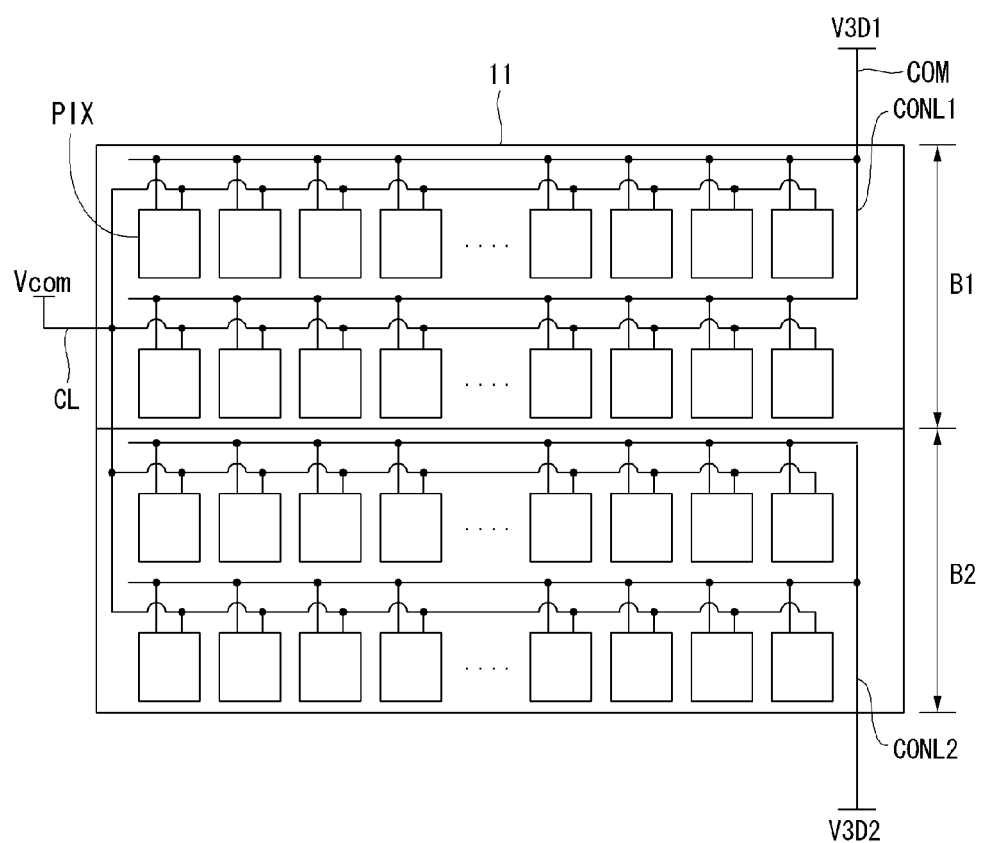
FIG. 8 illustrates an example of a 2-division driving manner of a stereoscopic image display.
Figure 9:
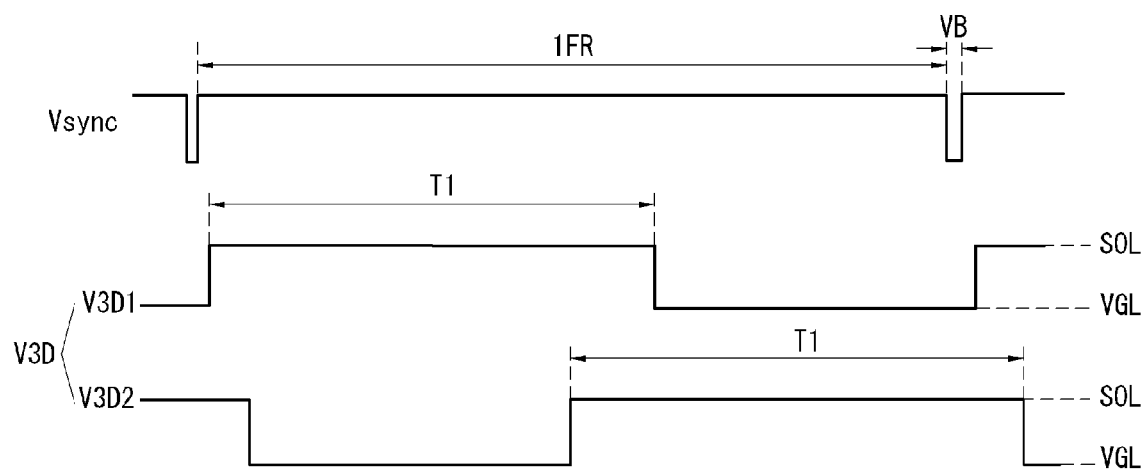
FIG. 9 is a waveform diagram illustrating a waveform of a discharge control voltage for carrying out the 2-division driving manner shown in FIG. 8.
Figure 10:
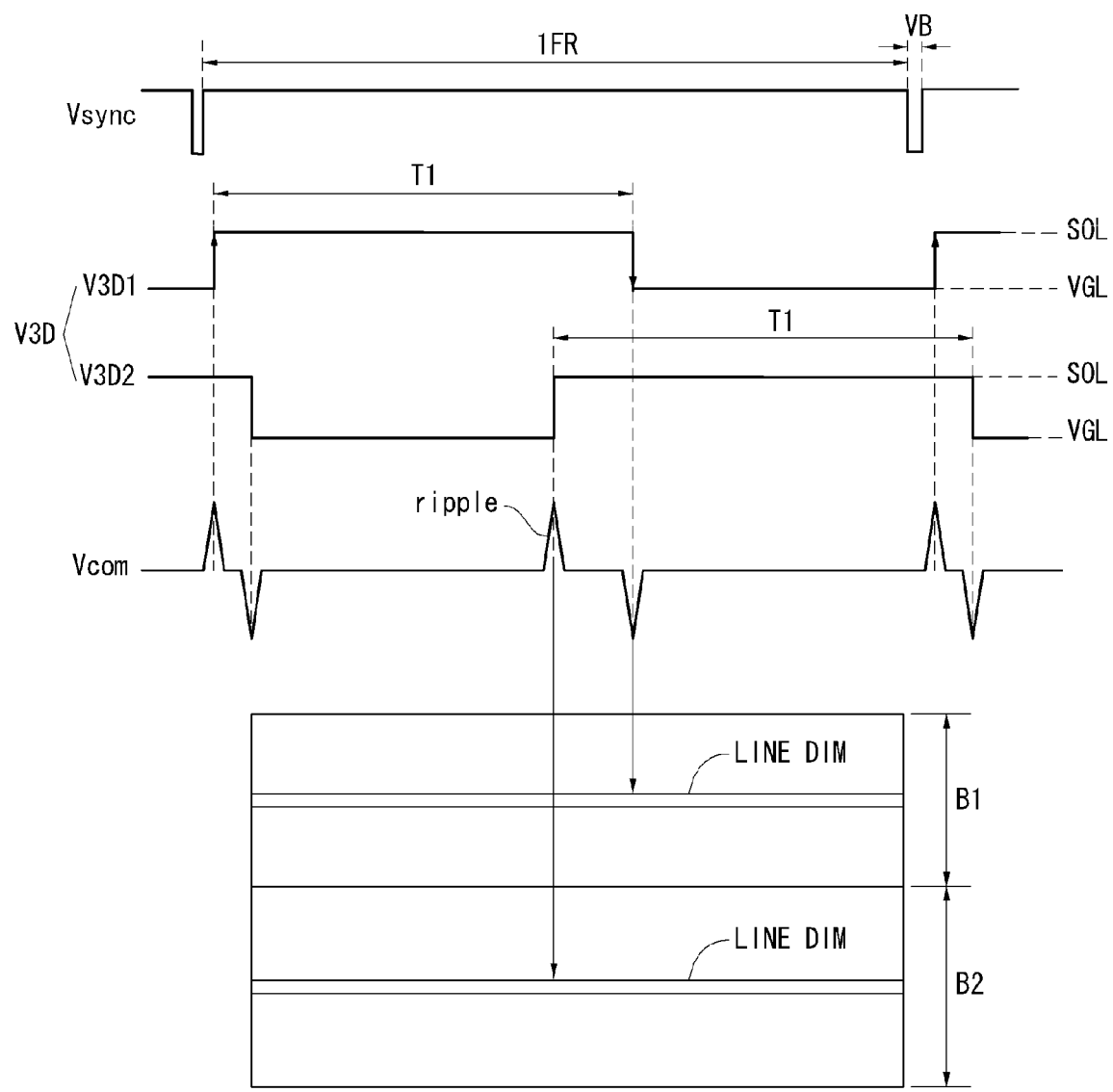
FIG. 10 illustrates a ripple of a common voltage and a line dim resulting from the discharge control voltage shown in FIG. 9 when a 2-division driving manner is carried out.

FIG. 8 illustrates an example of a 2-division driving manner of the stereoscopic image display according to one embodiment of the invention. FIG. 9 illustrates a waveform of the discharge control voltage for carrying out the 2-division driving manner shown in FIG. 8. FIG. 10 illustrates a ripple of the common voltage and a line dim resulting from the discharge control voltage shown in FIG. 9 when the 2-division driving manner is carried out.

As shown in FIGS. 8 and 9, the display panel 11 may be divided into upper and lower parts, i.e., a first screen block B1 and a second screen block B2 in a vertical direction. The first screen block B1 includes pixels present in an upper half of the pixel array of the display panel 11, and the second screen block B2 includes pixels present in a lower half of the pixel array of the display panel 11. If the scan pulse is sequentially supplied from the first gate line to the last gate line, the scan timing of the lower half of the pixel array is later than the scan timing of the upper half of the pixel array. FIG. 8 shows that each of the first and second screen blocks B1 and B2 includes the pixels of two lines for the sake of brevity and ease of reading. However, each of the first and second screen blocks B1 and B2 may include the pixels of two or more lines.

The discharge control line CONL is divided into a first discharge control line CONL1 connected to the auxiliary display units SP belonging to the first screen block B1 and a second discharge control line CONL2 connected to the auxiliary display units SP belonging to the second screen block B2. The discharge control voltage V3D is divided into a first discharge control voltage V3D1 and a second discharge control voltage V3D2.

The AC type first discharge control voltage V3D1 is supplied to the first discharge control line CONL1. In the 3D mode, the first discharge control voltage V3D1 is held at the slight-on level SOL for a predetermined period of time T1 from a start time of a frame period 1FR, and then is reduced to the level of the gate low voltage VGL. The time T1 is longer than one half of the frame period 1FR and is shorter than the frame period 1FR. The discharge control TFTs DST of the auxiliary display units SP present in the first screen block B1 are turned on due to the first discharge control voltage V3D1 supplied to the first discharge control line CONL1, and thus may completely discharge the voltages of the auxiliary display units SP to the voltage of the black gray level for the time T1.

The AC type second discharge control voltage V3D2 is supplied to the second discharge control line CONL2. A phase of the second discharge control voltage V3D2 lags a phase of the first discharge control voltage V3D1 by about a half frame period. In the 3D mode, the second discharge control voltage V3D2 increases to the slight-on level SOL from about one half of the frame period 1FR, and then is held at the slight-on level SOL for the time T1. In other words, the second discharge control voltage V3D2 increases to the slight-on level SOL from about one half of a current frame period, is held at the slight-on level SOL until the predetermined period of time t0 (refer to FIG. 5) has passed from a start time of a next frame period, and then is reduced to the level of the gate low voltage VGL, so as to secure a sufficient discharge time of the auxiliary display units of the pixels, in which the scan timing is later than other pixels. The discharge control TFTs of the auxiliary display units belonging to the second screen block B2 are turned on due to the second discharge control voltage V3D2 supplied to the second discharge control line CONL2, and thus sufficiently discharge the voltages of the auxiliary display units to the voltage of the black gray level for the time T1.

Because the first discharge control voltage V3D1 is held at the level of the gate low voltage VGL for a remaining time excluding the time T1 from the frame period 1FR, the discharge control TFTs of the first screen block B1 have a sufficient time to spare for the recovery of the gate bias stress. Further, because the second discharge control voltage V3D2 is held at the level of the gate low voltage VGL for a long period of time, the discharge control TFTs of the second screen block B2 have a sufficient time to spare for the recovery of the gate bias stress.

The division driving manner is to secure the sufficient discharge time and improve the reliability of the discharge control TFTs. However, a falling timing of the first discharge control voltage V3D1 and a rising timing of the second discharge control voltage V3D2 have to be positioned in a start region, a middle region, and a last region of the frame period 1FR, so as to carry out the division driving manner. Sharp changes in the levels of the discharge control voltages V3D1 and V3D2 affect the common voltage Vcom, and thus immediately change the common voltage Vcom.

Ripple of the common voltage Vcom generated in the start region and the last region of the frame period 1FR corresponds to a vertical blank period VB and a period close to the vertical blank period VB, and thus does not actually affect a display image. However, ripple of the common voltage Vcom generated in the middle region of the frame period 1FR corresponds to a display period, and thus greatly affects the display image. If the common voltage Vcom changes, a display gray level of the pixel may be distorted. Thus, as a ripple amount of the common voltage Vcom increases, a line dim type display image appears in a generation area of the ripple. In FIG. 10, a line dim of the first screen block B1 results from the sharp falling of the first discharge control voltage V3D1 generated in the middle region of the frame period 1FR, and a line dim the of the second screen block B2 results from the sharp rising of the second discharge control voltage V3D2 generated in the middle region of the frame period 1FR.

In the division drive, the levels of the discharge control voltages V3D1 and V3D2 have to gradually change so as to prevent or reduce the line dim. Examples of a method for gradually changing the levels of the discharge control voltages V3D1 and V3D2 mainly include a circuital implementation method and a process implementation method.

Figure 11:
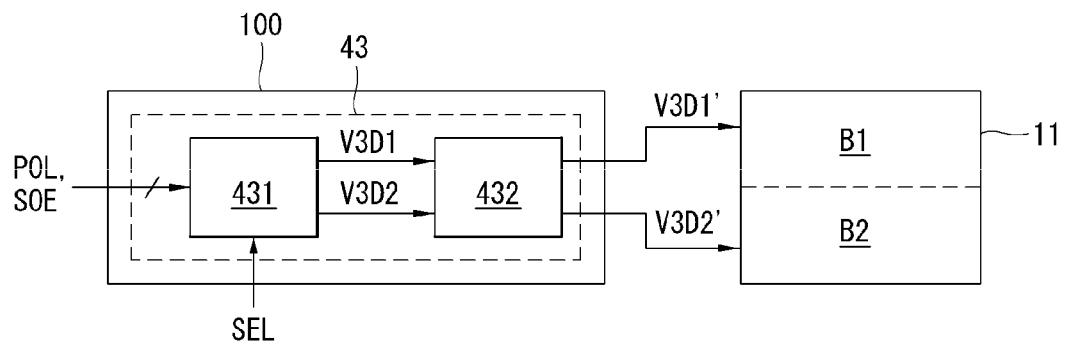
FIG. 11 illustrates an inner configuration of a discharge control voltage generating circuit including a control voltage delay unit in a method for preventing a line dim shown in FIG. 10.
Figure 12:
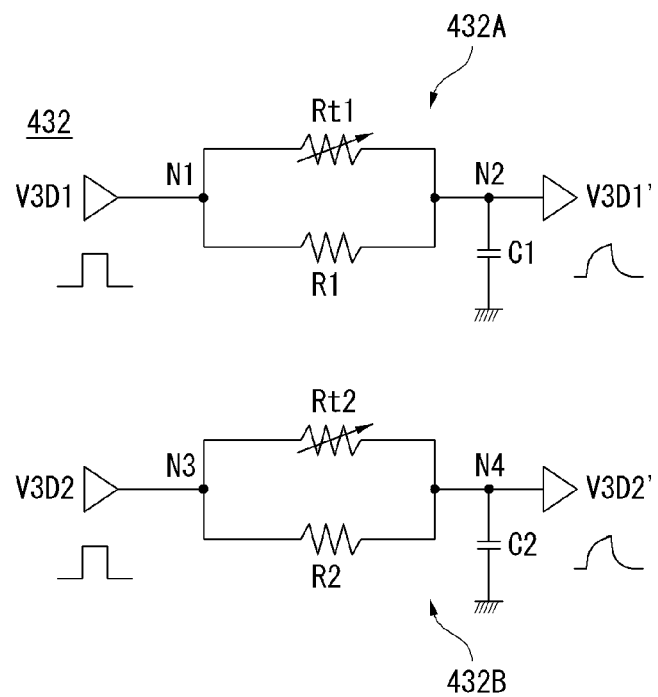
FIG. 12 is an equivalent circuit diagram illustrating in detail a control voltage delay unit shown in FIG. 11.
Figure 13:
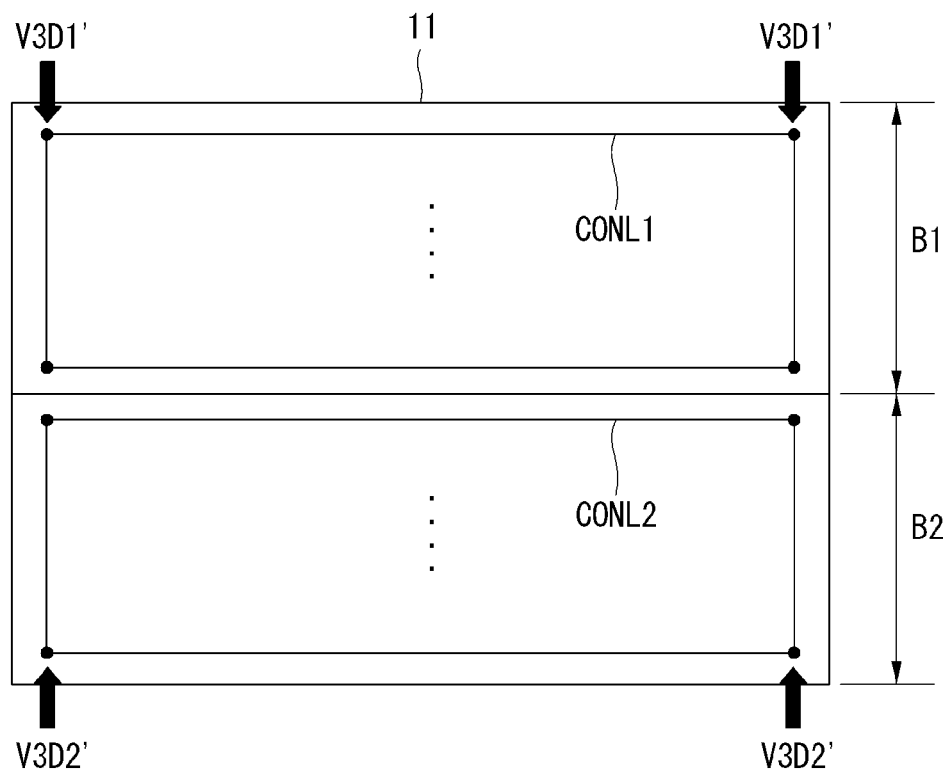
FIG. 13 illustrates a waveform of a discharge control voltage delayed by a control voltage delay unit shown in FIG. 12 and a reduction in ripple of a common voltage resulting from the delayed discharge control voltage.
Figure 14:
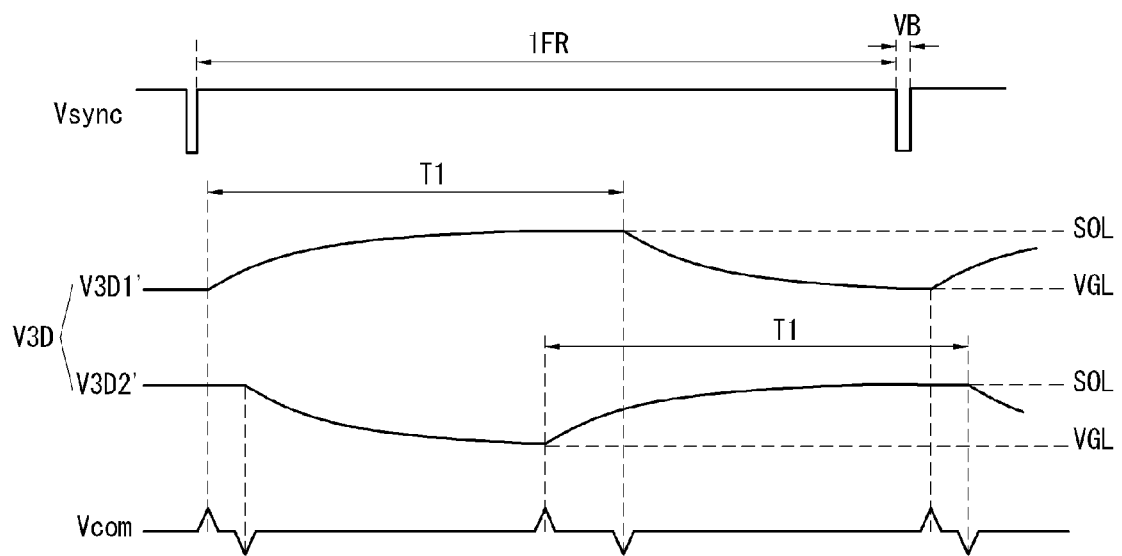
FIG. 14 illustrates discharge control lines of a display panel, to which a delayed discharge control voltage is applied.

FIGS. 11 and 12 illustrate the discharge control voltage generating circuit including a control voltage delay unit in a method for preventing the line dim shown in FIG. 10. FIG. 13 illustrates a waveform of the discharge control voltage delayed by the control voltage delay unit shown in FIG. 12 and a reduction in the ripple of the common voltage resulting from the delayed discharge control voltage. FIG. 14 illustrates the discharge control lines of the display panel, to which the delayed discharge control voltage is applied.

As shown in FIGS. 11 and 12, the discharge control voltage generating circuit 43 includes a control voltage generator 431 and a control voltage delay unit 432. The control voltage generator 431 and the control voltage delay unit 432 may be mounted on a 3D board 100.

The control voltage generator 431 generates different discharge control voltage V3D in response to the mode selection signal SEL. The control voltage generator 431 may include a power IC and a level shifter. In the 2D mode, the control voltage generator 431 level-shifts an input DC voltage supplied by the power IC, thereby generating the first and second discharge control voltages V3D1 and V3D2 of the same level as the gate low voltage VGL. In the 3D mode, the control voltage generator 431 generates first and second control pulses each including a high period (i.e., an SOL period of FIG. 9) and a low period (i.e., a VGL period of FIG. 9) based on the polarity control signal POL, the source output enable SOE, etc. received from the controller 30. Further, in the 3D mode, the control voltage generator 431 level-shifts the first and second control pulses using the input DC voltage supplied by the power IC, thereby generating the first and second discharge control voltages V3D1 and V3D2, each of which alternates the slight-on level SOL and the level of the gate low voltage VGL as shown in FIG. 9.

The control voltage delay unit 432 receives the first and second discharge control voltages V3D1 and V3D2 from the control voltage generator 431. In the 3D mode, the control voltage delay unit 432 delays the first and second discharge control voltages V3D1 and V3D2 and generates a delayed first discharge control voltage V3D1' and a delayed second discharge control voltage V3D2'. For this, the control voltage delay unit 432 includes a first delay unit 432A for delaying the first discharge control voltage V3D1 and a second delay unit 432B for delaying the second discharge control voltage V3D2.

The first delay unit 432A includes a first resistor R1 connected between a first node N1 and a second node N2 and a first capacitor C1 connected between the second node N2 and ground. The first delay unit 432A delays the first discharge control voltage V3D1 by a time constant defined by multiplication of a value of the first resistor R1 and a value of the first capacitor C1. The first delay unit 432A further includes a first variable resistor Rt1, which is positioned between the first node N1 and the second node N2 and is connected in parallel to the first resistor R1, thereby easily adjusting RC deviation of each panel.

The second delay unit 432B includes a second resistor R2 connected between a third node N3 and a fourth node N4 and a second capacitor C2 connected between the fourth node N4 and the ground. The second delay unit 432B delays the second discharge control voltage V3D2 by a time constant defined by multiplication of a value of the second resistor R2 and a value of the second capacitor C2. The second delay unit 432B further includes a second variable resistor Rt2, which is positioned between the third node N3 and the fourth node N4 and is connected in parallel to the second resistor R2, thereby easily adjusting RC deviation of each panel.

The first and second resistors R1 and R2 are designed to be equal to each other, and the first and second capacitors C1 and C2 are designed to be equal to each other. Further, the first and second variable resistors Rt1 and Rt2 are designed to be equal to each other.

As shown in FIG. 13, the control voltage delay unit 432 supplies the delayed first discharge control voltage V3D1' to the first discharge control line CONL1 of the first screen block B1. The control voltage delay unit 432 supplies the delayed second discharge control voltage V3D2' to the second discharge control line CONL2 of the second screen block B2. In this instance, the first and second discharge control lines CONL1 and CONL2 have a straight line pattern.

As shown in FIG. 14, the delayed first discharge control voltage V3D1' gradually rises to the slight-on level SOL within the time T1 of the frame period 1FR, and then gradually falls to the level of the gate low voltage VGL within a remaining time excluding the time T1 from the frame period 1FR. The delayed second discharge control voltage V3D2' gradually rises to the slight-on level SOL from about one half of a current frame period until the predetermined period of time t0 (refer to FIG. 5) has passed from a start time of a next frame period, and then gradually falls to the level of the gate low voltage VGL from a time, at which the predetermined period of time t0 (refer to FIG. 5) passed in the next frame period.

Because the delayed first and second discharge control voltages V3D1' and V3D2' do not sharply rise or sharply fall, a ripple amount of the common voltage Vcom greatly decreases as shown in FIG. 14.

Figure 15:
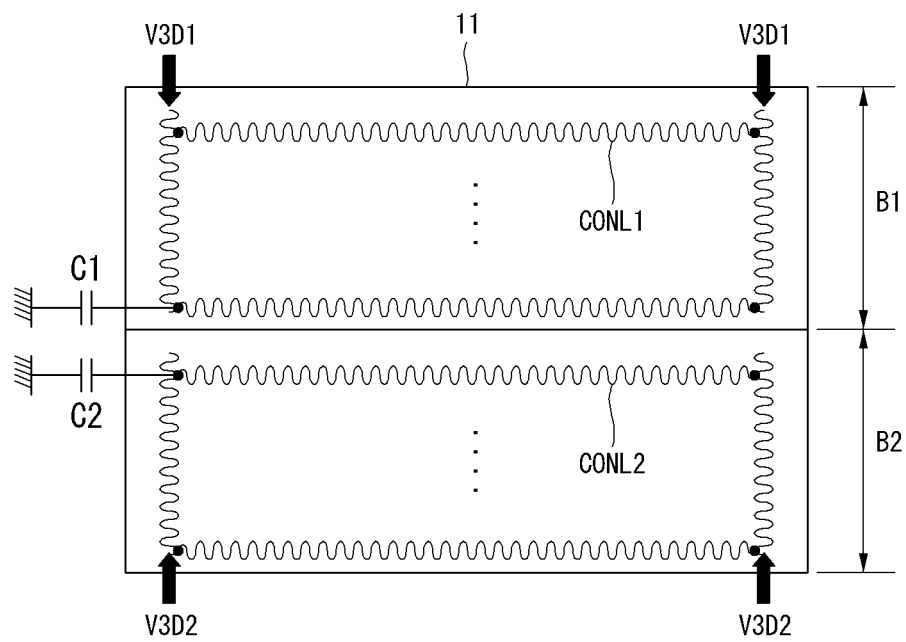
FIG. 15 illustrates discharge control lines of a wavy form on a display panel for delaying a discharge control voltage, in another method for preventing a line dim shown in FIG. 10.

FIG. 15 illustrates another method for preventing the line dim shown in FIG. 10. As shown in FIG. 15, the embodiment of the invention may form the first discharge control line CONL1 of the first screen block B1 in a wavy curve form and may form a first capacitor C1 between one side of the first discharge control line CONL1 and ground, so as to delay the first discharge control voltage V3D1 which sharply rises or sharply falls as shown in FIG. 9. Further, the embodiment of the invention may form the second discharge control line CONL2 of the second screen block B2 in a wavy curve form and may form a second capacitor C2 between one side of the second discharge control line CONL2 and ground, so as to delay the second discharge control voltage V3D2 which sharply rises or sharply falls as shown in FIG. 9. Hence, the first discharge control voltage V3D1 may be delayed in the same form as the delayed first discharge control voltage V3D1' shown in FIG. 14 in the first screen block B1. The second discharge control voltage V3D2 may be delayed in the same form as the delayed second discharge control voltage V3D2' shown in FIG. 14 in the second screen block B2.

Figure 16:
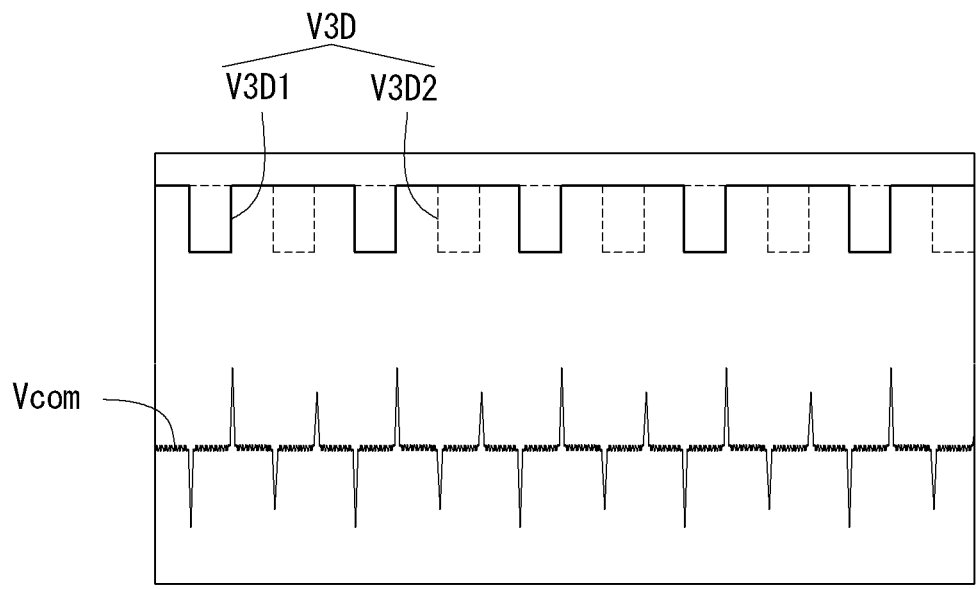
FIG. 16 illustrates changes in a ripple magnitude of a common voltage depending on whether or not a discharge control voltage is delayed.
Figure 16:
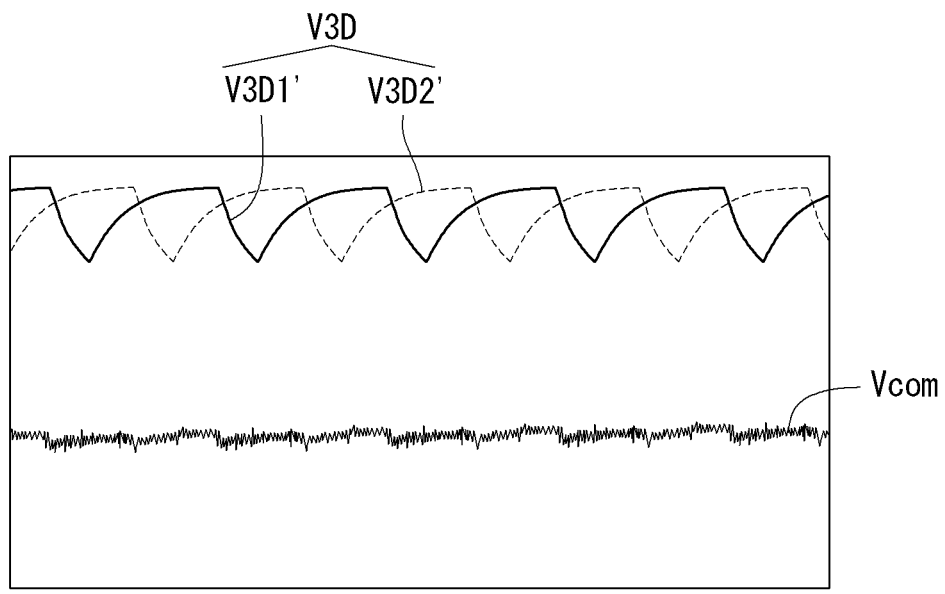
Figure 17:
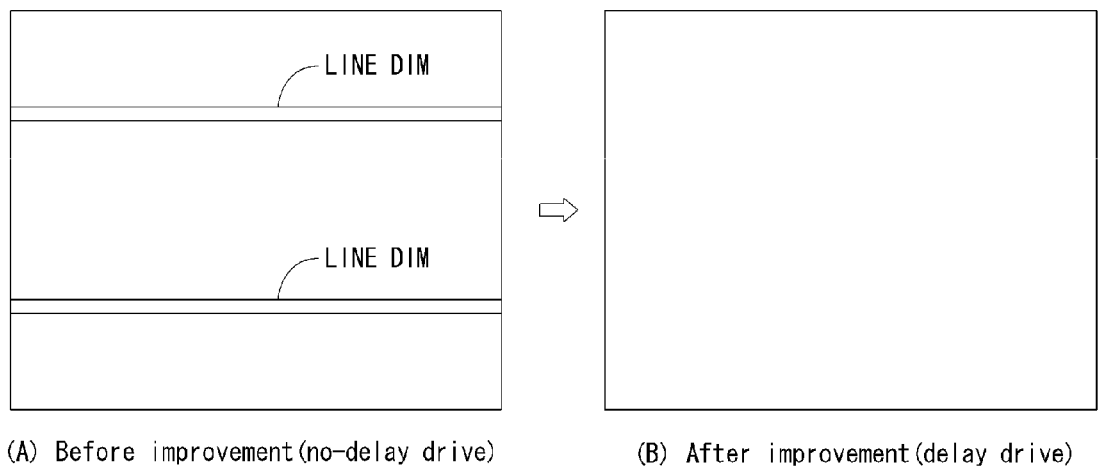
FIG. 17 illustrates that a line dim is prevented due to the delay of a discharge control voltage.

FIG. 16 illustrates changes in a ripple magnitude of the common voltage depending on whether or not the discharge control voltage is delayed. FIG. 17 illustrates that the line dim is prevented due to the delay of the discharge control voltage.

As can be seen from the result of FIG. 16, the number of ripples of the common voltage Vcom in a time frame greatly decreases by the delayed first and second discharge control voltages V3D1' and V3D2'. When the number of ripples of the common voltage Vcom decreases, the line dim of the first and second screen blocks B1 and B2 may be prevented as shown in FIG. 17.

As described above, the stereoscopic image display according to the embodiment of the invention divides the display panel into N blocks and drives the display panel in the division driving manner, so as to secure the sufficient discharge period of the auxiliary display units (i.e., the active black stripes) and efficiently prevent the degradation of the discharge control TFTs of the auxiliary display units. The stereoscopic image display according to the embodiment of the invention forms the discharge control line in the division driving manner, so that the control voltage delay unit previously delays the discharge control voltage and then applies the delayed discharge control voltage to the display panel, or applies the discharge control voltage to the display panel and then delays the discharge control voltage. Hence, the line dim generated in the division driving manner may be efficiently prevented.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
a display panel including data lines, gate lines crossing the data lines, and a plurality of pixels, each of which includes a main display unit and an auxiliary display unit, the display panel being divided into a first screen block and a second screen block, the display panel including a first discharge control line connected to auxiliary display units of the first screen block and a second discharge control line connected to auxiliary display units of the second screen block;
a data driving circuit configured to supply a data voltage of a 2D image to the data lines in a 2D mode and supply a data voltage of a 3D image to the data lines in a 3D mode;
a gate driving circuit configured to sequentially supply a scan pulse swinging between a gate low voltage and a gate high voltage to the gate lines in the 2D mode and the 3D mode;
a control voltage generator configured to generate a first discharge control voltage of a first alternating current (AC) waveform and a second discharge control voltage of a second AC waveform, of which a phase is later than a phase of the first AC waveform by a half frame period, in the 3D mode; and
a control voltage delay unit configured to delay the first discharge control voltage, supply the delayed first discharge control voltage to the first discharge control line, delay the second discharge control voltage, and supply the delayed second discharge control voltage to the second discharge control line.

2. The stereoscopic image display of claim 1, wherein each of the first and second discharge control voltages generated by the control voltage generator swings between a slight-on level, which is higher than the gate low voltage and is lower than the gate high voltage, and a level of the gate low voltage,
wherein a period during which each of the first and second discharge control voltages is held at the slight-on level is longer than a period during which each of the first and second discharge control voltages is held at the level of the gate low voltage,
wherein a period during which the first discharge control voltage is held at the slight-on level partially overlaps with a period during which the second discharge control voltage is held at the slight-on level.

3. The stereoscopic image display of claim 1, wherein the control voltage delay unit includes:
a first delay unit configured to delay the first discharge control voltage, the first delay unit including a first resistor connected between a first node and a second node and a first capacitor connected between the second node and ground; and
a second delay unit configured to delay the second discharge control voltage, the second delay unit including a second resistor connected between a third node and a fourth node and a second capacitor connected between the fourth node and ground.

4. The stereoscopic image display of claim 3, wherein the first delay unit further includes a first variable resistor positioned between the first node and the second node and is connected in parallel to the first resistor,
wherein the second delay unit further includes a second variable resistor positioned between the third node and the fourth node and is connected in parallel to the second resistor.

5. The stereoscopic image display of claim 2, wherein the first discharge control voltage delayed by the control voltage delay unit gradually rises to the slight-on level and then gradually falls to the level of the gate low voltage,
wherein a phase of the second discharge control voltage delayed by the control voltage delay unit is later than a phase of the delayed first discharge control voltage by a half frame period,
wherein the delayed second discharge control voltage gradually rises to the slight-on level and then gradually falls to the level of the gate low voltage.

6. A stereoscopic image display comprising:
a display panel including data lines, gate lines crossing the data lines, and a plurality of pixels, each of which includes a main display unit and an auxiliary display unit, the display panel being divided into a first screen block and a second screen block, the display panel including a first discharge control line connected to auxiliary display units of the first screen block and a second discharge control line connected to auxiliary display units of the second screen block;
a data driving circuit configured to supply a data voltage of a 2D image to the data lines in a 2D mode and supply a data voltage of a 3D image to the data lines in a 3D mode;
a gate driving circuit configured to sequentially supply a scan pulse swinging between a gate low voltage and a gate high voltage to the gate lines in the 2D mode and the 3D mode; and
a control voltage generator configured to generate a first discharge control voltage of a first alternating current (AC) waveform in the 3D mode, supply the first discharge control voltage to the first discharge control line, generate a second discharge control voltage of a second AC waveform having a phase that lags a phase of the first AC waveform by a half frame period in the 3D mode, and supply the second discharge control voltage to the second discharge control line,
wherein each of the first discharge control line and the second discharge control line is in a wavy form.

7. The stereoscopic image display of claim 6, wherein a first capacitor is formed between one side of the first discharge control line and ground in the first screen block,
wherein a second capacitor is formed between one side of the second discharge control line and ground in the second screen block.

8. The stereoscopic image display of claim 6, wherein each of the first and second discharge control voltages generated by the control voltage generator swings between a level of the gate low voltage and a slight-on level higher than the gate low voltage but lower than the gate high voltage and,
wherein a period during which each of the first and second discharge control voltages is held at the slight-on level is longer than a period during which each of the first and second discharge control voltages is held at the level of the gate low voltage,
wherein a period during which the first discharge control voltage is held at the slight-on level partially overlaps with a period during which the second discharge control voltage is held at the slight-on level.

* * * * *